United States Patent
Hall-Snyder et al.

(10) Patent No.: US 10,450,046 B1
(45) Date of Patent: Oct. 22, 2019

(54) SEPARATION APPARATUS FOR SEPARATING A FIRST OBJECT FROM A SECOND OBJECT

(71) Applicant: LOON LLC, Mountain View, CA (US)

(72) Inventors: Michael Hall-Snyder, Palo Alto, CA (US); Kyle Brookes, Redwood City, CA (US)

(73) Assignee: Loon LLC, Mountain View, CA (US)

( * ) Notice: Subject to any disclaimer, the term of this patent is extended or adjusted under 35 U.S.C. 154(b) by 0 days.

(21) Appl. No.: 16/043,515

(22) Filed: Jul. 24, 2018

Related U.S. Application Data (63) Continuation of application No. 14/960,739, filed on Dec. 7, 2015, now Pat. No. 10,059,420.

(51) Int. Cl.
  *B64B 1/62* (2006.01)
  *B64B 1/46* (2006.01)

(52) U.S. Cl.
  CPC ..................... *B64B 1/46* (2013.01)

(58) Field of Classification Search
  CPC .... B64B 1/62; B64B 1/40; B64B 1/44; B64B 1/64; B64B 1/70; B64B 1/46; B64B 1/48; B64B 1/58; B64B 1/66; E21D 15/08; E21D 15/10; E06C 7/083
  See application file for complete search history.

(56) References Cited

U.S. PATENT DOCUMENTS

| | | | |
|---|---|---|---|
| 3,098,630 A * | 7/1963 | Connors | B64D 19/00 102/387 |
| 3,302,906 A | 2/1967 | Winker | |
| 4,387,868 A * | 6/1983 | Regipa | B64B 1/40 244/31 |
| 4,911,379 A * | 3/1990 | Kopelman | A63H 27/10 116/210 |
| 6,234,425 B1 * | 5/2001 | Rand | B64B 1/46 244/137.4 |
| 6,628,941 B2 | 9/2003 | Knoblach et al. | |
| 7,801,522 B2 | 9/2010 | Knoblach et al. | |
| 7,959,180 B1 * | 6/2011 | Huston | B60D 1/04 280/482 |
| 8,690,181 B1 * | 4/2014 | Roeber | B60D 1/145 280/456.1 |
| 9,346,531 B1 | 5/2016 | Washburn et al. | |

(Continued)

FOREIGN PATENT DOCUMENTS

WO 1995/004407 A1 2/1995

*Primary Examiner* — Assres H Woldemaryam
(74) *Attorney, Agent, or Firm* — Botos Churchill IP Law (57) ABSTRACT

Aspects of the disclosure relate to terminating flight of a balloon that may include separating a connection between a balloon envelope and a payload of the balloon. In one example, a payload separation apparatus includes a first shaft configured to attach to the envelope, a second shaft configured to attach to the payload, a pair of arms, and a bracket arranged to secure the pair of arms to the first shaft. In another example, a system includes a flight termination assembly having a cutting edge configured to cut an opening in the envelope and a payload separation apparatus. The apparatus includes a first shaft configured to attach to the envelope, a second shaft configured to attach to the payload, a pair of arms, and a bracket configured to secure the pair of arms to the first shaft. The system also includes a controller configured to activate the cutting edge.

38 Claims, 11 Drawing Sheets

(56) References Cited

U.S. PATENT DOCUMENTS

| | | | |
|---|---|---|---|
| 9,678,193 B2* | 6/2017 | Knoblach | B64B 1/40 |
| 2005/0014499 A1* | 1/2005 | Knoblach | B64B 1/40 |
| | | | 455/431 |
| 2014/0367511 A1 | 12/2014 | Knoblach et al. | |
| 2017/0015346 A1* | 1/2017 | Johta | B62D 1/195 |
| 2017/0057608 A1* | 3/2017 | Knoblach | B64B 1/40 |
| 2017/0083019 A1* | 3/2017 | Knoblach | G05D 1/0055 |
| 2017/0108578 A1* | 4/2017 | Knoblach | B64B 1/40 |

* cited by examiner

SEPARATION APPARATUS FOR SEPARATING A FIRST OBJECT FROM A SECOND OBJECT

CROSS-REFERENCE TO RELATED APPLICATIONS

The present application is a continuation of U.S. patent application Ser. No. 14/960,739, filed Dec. 7, 2015, the disclosure of which is incorporated herein by reference.

BACKGROUND

Computing devices such as personal computers, laptop computers, tablet computers, cellular phones, and countless types of Internet-capable devices are increasingly prevalent in numerous aspects of modem life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

Some systems may provide network access via a balloon network. Because of the various forces experienced by these balloons during deployment and operation, there is a balancing of needs between flexibility and stability of materials. As such, the balloons include a flexible envelope made of material that may be configured in sections or lobes to create a "pumpkin" or lobed balloon. These lobes are supported by a plurality of tendons. During normal operations, the balloon envelope is filled with gas so that it can float above the Earth. At some point, the balloon may need to be brought back to the ground, for example, for retrieval, maintenance or servicing of balloon components.

BRIEF SUMMARY

One aspect of the disclosure provides a payload separation apparatus for separating a connection between a balloon envelope and a payload of a balloon. The apparatus includes a first shaft configured to attach to the balloon envelope, a second shaft configured to attach to the payload, a pair of arms, and a bracket arranged to secure the pair of arms to the first shaft.

In one example, the first shaft includes two openings, the second shaft includes two slots arranged in line with the two openings, and the system further includes a bolt arranged through the two openings and the two slots. In this example, each arm of the pair of arms includes an opening at one end and the bolt is further arranged through the openings in the arms. In another example, the second shaft includes two openings, the first shaft includes two slots arranged in line with the two openings, and the system further includes a pair of projections on the second shaft arranged through the two openings and the two slots. In this example, each arm of the pair of arms includes a finger at one end, and each of the fingers are arranged to sit around at least a portion of one of the projections of the pair of projections. In another example, the bracket includes two openings, each of the arms include an opening at one end, and the system further comprises a bolt arranged through the two openings and the openings in the arms, the bolt securing the arms to the bracket. In another example, the bracket includes two arms and a base which form an opening and the first shaft is arranged within the opening. In this example, each arm of the bracket includes a corresponding opening and the system further comprises a pin. In addition, the apparatus also includes a cutting device configured to cut the pin and release the bracket from the first shaft.

Another aspect of the disclosure provides a system. The system includes a flight termination assembly for a balloon having a balloon envelope and a payload. The flight termination assembly includes a cutting edge configured to cut an opening in the balloon envelope and a payload separation apparatus for separating a connection between the balloon envelope and a payload of a balloon. The apparatus includes a first shaft configured to attach to the balloon envelope, a second shaft configured to attach to the payload, a pair of arms, and a bracket configured to secure the pair of arms to the first shaft. The system also includes a controller configured to activate the cutting edge and the payload separation apparatus in order to cause the payload to fall away from the balloon envelope pulling on the cutting edge to cut the opening in the balloon envelope.

In one example, the cutting edge is connected to the payload via tether. In another example, the bracket includes two arms and a base which form an opening and the first shaft is arranged within the opening. In this example, each arm of the bracket includes a corresponding opening and the system further comprises a pin. In addition, the system also includes a second cutting device configured to cut the pin and release the bracket from the first shaft which causes the first shaft to separate from the second shaft which causes the payload to fall away from the balloon envelope. In addition, the control device is configured to activate the second cutting device in order to activate the payload separation apparatus.

A further aspect of the disclosure provides a method of separating a connection between a payload and a balloon envelope of a balloon. The method includes using a cutting edge to cut a pin. Cutting the pin causes a first shaft connected to the balloon envelope to separate from a second shaft connected to the payload. The method also includes, after the first shaft has separated from the first shaft, pulling on the cutting edge by the payload to cut a hole in the balloon envelope in order to cause the balloon to begin descending, and also using the weight of the payload to increase the size of the opening and increase a rate at which the balloon descends.

In one example, the method also includes, after using the weight of the payload, catching the payload using a safety tether so that the balloon envelope and payload remain attached as the balloon descends. In another example, using the weight of the payload includes pulling the cutting edge along a track. In another example, cutting the pin causes two arms of a bracket to separate from one anther which, in turn, causes the arms to pull a base of the bracket away from the first shaft in order to separate the first shaft from the second shaft. In another example, when the arms pull the base of the bracket away from the first shaft, the arms release a bolt which holds the first shaft to the second shaft.

DETAILED DESCRIPTION

The technology relates to flight termination systems for high altitude balloons such as those used in communication networks. A single network may include a large number of balloons, each of which includes a balloon envelope, a payload including a solar panel, and a cable or other connection between the envelope and the payload. In order to terminate a flight, these balloons may include a flight termination system. The flight termination system may be configured a hole may be cut into the balloon envelope. For example, the flight termination system may include a button having a spring loaded cutting edge or other type of cutting device. This cutting device may be activated remotely by an electrical signal to a receiver at the cutting device. When actuated, the cutting device may cut a hole in a section of the balloon in order to open a hole in the balloon envelope, allowing lift gas to escape and the balloon to descend.

However, in some cases, this hole may cause the balloon envelope to deflate too slowly. In that regard, a weight may be used to pull on the cutting device of the flight termination system and create a larger opening. Of course, adding weight to the balloon to assist the flight termination system can require modification to other aspects of the balloon as well. Thus, rather than adding a separate weight, the weight of a balloon's payload may be used to assist the flight termination system.

In order to use the weight of the balloon's payload, the payload must be attached to the balloon envelope in a way that allows the payload to be disconnected from the balloon envelope and to cause a pulling force on the cutting device of the flight termination system. In this regard, the payload may be tethered to the button. In addition, to allow the payload to fall away from the balloon envelope, the balloon may include a payload separation apparatus.

Prior to separation, the payload separation apparatus may include two shafts which connect with one another and are locked together using a pin. As an example, a second shaft may be slide at least partially within a first shaft. The first and second shafts may be configured to connect with the balloon envelope and the payload, respectively. These shafts, in turn, connect to the balloon envelope and payload. A pair of arms attached to a bracket may be used to secure the first and second shafts, and also the balloon envelope and payload, to one another.

The pair of arms may each connect to the first shaft via a first bolt. The first bolt may be arranged through a pair of holes in the first shaft and a pair of corresponding first holes, one in each of the arms. Prior to separation, when the first and second shafts are connected, the first bolt may sit within two first slots at opposite sides of the first shaft.

Adjacent to the respective corresponding first hole in each arm may be a curved finger which is configured to rest around a corresponding projection of the second shaft. Prior to separation, when the first and second shafts are connected, each projection may within one of two second slots at opposite sides of the first shaft.

Each of the arms may be connected to the bracket via a second bolt. For example, at an opposite end of each arm from the fingers may be a corresponding second hole. The second holes may be aligned with two first holes in the bracket. The second bolt may thus be arranged through the corresponding second holes and the first bracket holes.

The bracket may include a base, two bracket arm structures, and an opening there between. The bracket holes may be arranged through the arm structures proximate to the base. At the opposite end of the two bracket arm structures may be two second holes. Prior to separation, the bracket arm structures may be arranged around the first shaft such that the first shaft sits within the opening. A pin, placed through the two second holes, holds the bracket arm structures and bracket in place around the first shaft.

A squib may be arranged around the pin at a blade end of the squib which houses a blade. The arms and angle of contact with the pin cause the squib to see only a small fraction of the total load on the system.

In order to keep the payload and balloon envelope secured to one another, while at the same time allowing the payload to fall away from the balloon envelope, a safety tether may also be used.

The payload separation apparatus may be activated by an electrical signal to the squib. The electrical signal may trigger the squib the blade from its housing. The blade then cuts through the pin. Cutting of the pin causes the bracket arms to separate, releasing the first shaft from the bracket. At the same time, the weight of the payload and the angle of the contact area of the arms cause the arms to pivot around the first bolt pulling the base of the bracket away from the first shaft. The pivoting motion then causes the fingers of the arms to release and pull away from the second bolt. Because there is nothing holding the first and second shafts together, they fall away from one another, causing the payload to fall away from the balloon envelope.

The initial force of the payload falling away from the balloon envelope yanks down on the flight termination tether which causes a jerking force on the cutting device of the flight termination system. This then causes the cutting device to tear cut an opening in the balloon envelope. The weight of the falling payload then continues to cause a pulling force on the cutting device via the tether. This pulling force causes the cutting device to tear along the length of the track increasing the size of the opening. At the same time, lift gas escapes through the increasing opening causing the balloon to descend. Eventually, a decelerator (if used) may slow down the payload to reduce shock loads on the flight termination system. When the payload reaches the end of the safety tether and the button is no longer tearing the balloon envelope, the payload may be caught on the safety tether so that the balloon envelope and payload stay together as the balloon continues to descend.

While many different types of flight termination systems and devices may be useful for balloons and ground-level applications, such systems are typically not suitable for high-altitude conditions. The features described above allow for a reliable, light weight, simply constructed, and economical payload separation apparatus. The arrangement of features described herein may also allow for significant load bearing capability in a small and light weight assembly which can handle both temperature extremes and cycles.

Aspects, features and advantages of the disclosure will be appreciated when considered with reference to the following description of embodiments and accompanying figures. The same reference numbers in different drawings may identify the same or similar elements. Furthermore, the following description is not limiting; the scope of the present technology is defined by the appended claims and equivalents. While certain processes in accordance with example embodiments are shown in the figures as occurring in a linear fashion, this is not a requirement unless expressly stated herein. Different processes may be performed in a different order or concurrently. Steps may also be added or omitted unless otherwise stated.

Figure 1:
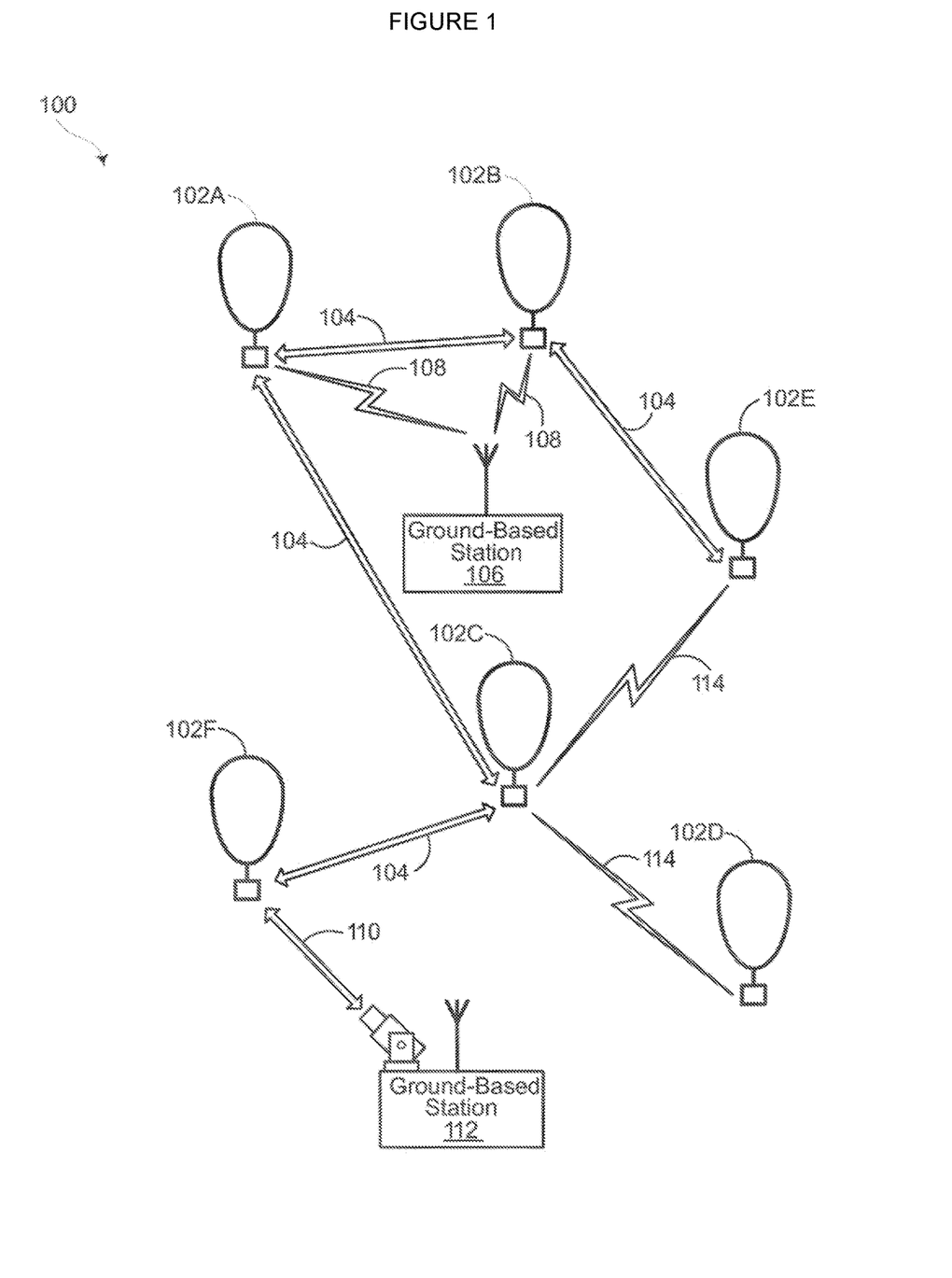
FIG. 1 is a functional diagram of a network in accordance with to aspects of the disclosure.

FIG. 1 depicts an example network 100 in which a balloon as described above may be used. This example should not be considered as limiting the scope of the disclosure or usefulness of the features of the flight termination system as described herein. For example, the flight termination system can be employed on various types of balloons, such as balloons carrying telescopes, surveillance gear, weather sensors or other types of standalone balloons or balloons used with other types of systems. In this example, network 100 may be considered a "balloon network." The balloon network 100 includes a plurality of devices, such as balloons 102A-F, ground base stations 106 and 112 and links 104, 108, 110 and 114 that are used to facilitate intra-balloon communications as well as communications between the base stations and the balloons. One example of a balloon is discussed in greater detail below with reference to FIG. 2.

Figure 2:
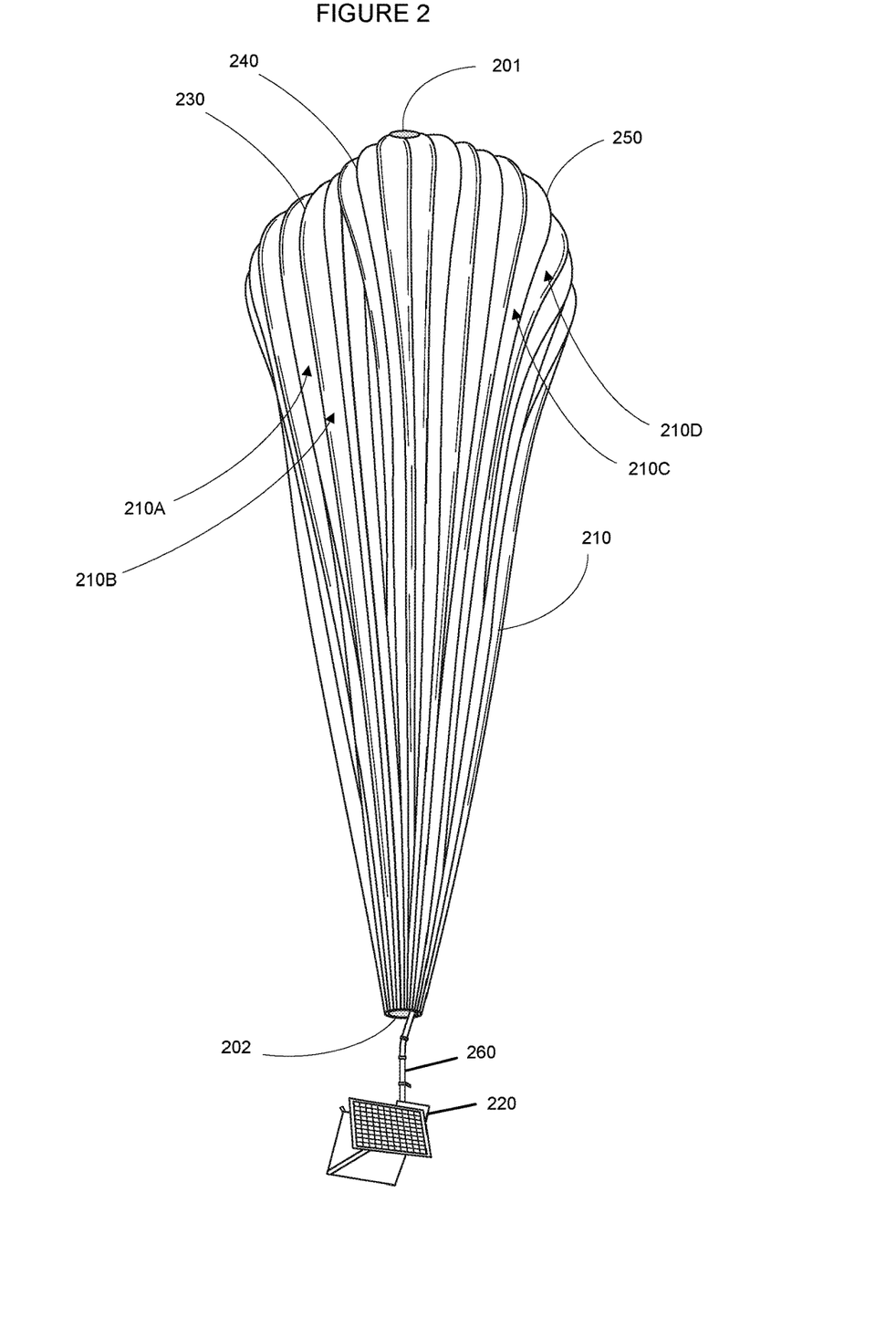
FIG. 2 is an example of a balloon in accordance with aspects of the disclosure.

FIG. 2 is an example balloon 200, which may represent any of the balloons of balloon network 100. As shown, the balloon 200 includes an envelope 210, a payload 220 and a plurality of tendons 230, 240 and 250 attached to the envelope 210.

The balloon envelope 210 may take various forms. In one instance, the balloon envelope 210 may be constructed from materials such as polyethylene that do not hold much load while the balloon 200 is floating in the air during flight. Additionally, or alternatively, some or all of envelope 210 may be constructed from a highly flexible latex material or rubber material such as chloroprene. Other materials or combinations thereof may also be employed. Further, the shape and size of the envelope 210 may vary depending upon the particular implementation. Additionally, the envelope 210 may be filled with various gases or mixtures thereof, such as helium, hydrogen or any other lighter-than-air gas. The envelope 210 is thus arranged to have an associated upward buoyancy force during deployment of the payload 220.

The payload 220 of balloon 200 is affixed to the envelope by a connection 260 such as a cable. The payload 220 may include a computer system (not shown), having one or more processors and on-board data storage. The payload 220 may also include various other types of equipment and systems (not shown) to provide a number of different functions. For example, the payload 220 may include an optical communication system, a navigation system, a positioning system, a lighting system, an altitude control system and a power supply to supply power to various components of balloon 200.

In view of the goal of making the balloon envelope 210 as lightweight as possible, it may be comprised of a plurality of envelope lobes or gores that have a thin film, such as polyethylene or polyethylene terephthalate, which is lightweight, yet has suitable strength properties for use as a balloon envelope. In this example, balloon envelope 210 is comprised of envelope gores 210A-210D.

Pressurized lift gas within the balloon envelope 210 may cause a force or load to be applied to the balloon 200. In that regard, the tendons 230-250 provide strength to the balloon 200 to carrier the load created by the pressurized gas within the balloon envelope 210. In some examples, a cage of tendons (not shown) may be created using multiple tendons that are attached vertically and horizontally. Each tendon may be formed as a fiber load tape that is adhered to a respective envelope gore. Alternately, a tubular sleeve may be adhered to the respective envelopes with the tendon positioned within the tubular sleeve.

Top ends of the tendons 230, 240 and 250 may be coupled together using a type of plate, such as top cap 201 positioned at the apex of balloon envelope 210. Bottom ends of the tendons 230, 240 and 250 may also be connected to one another. For example, a corresponding plate, e.g., bottom cap 202, is disposed at a base or bottom of the balloon envelope 210. The top cap 201 at the apex may be the same size and shape as and bottom cap 202 at the bottom. Both caps include corresponding components for attaching the tendons 230, 240 and 250. In some examples, the top cap 201 may serve a mounting point for certain systems attached to the balloon 200.

During normal operations, the balloon 200 floats in the air like other balloons in the network. However, there are different situations in which the balloon 200 may need to be brought back to the ground. For example, a user may need to bring down the balloon 200 on purpose, for example, to perform maintenance or for retrieval and inspection of certain balloon components.

Figure 3:
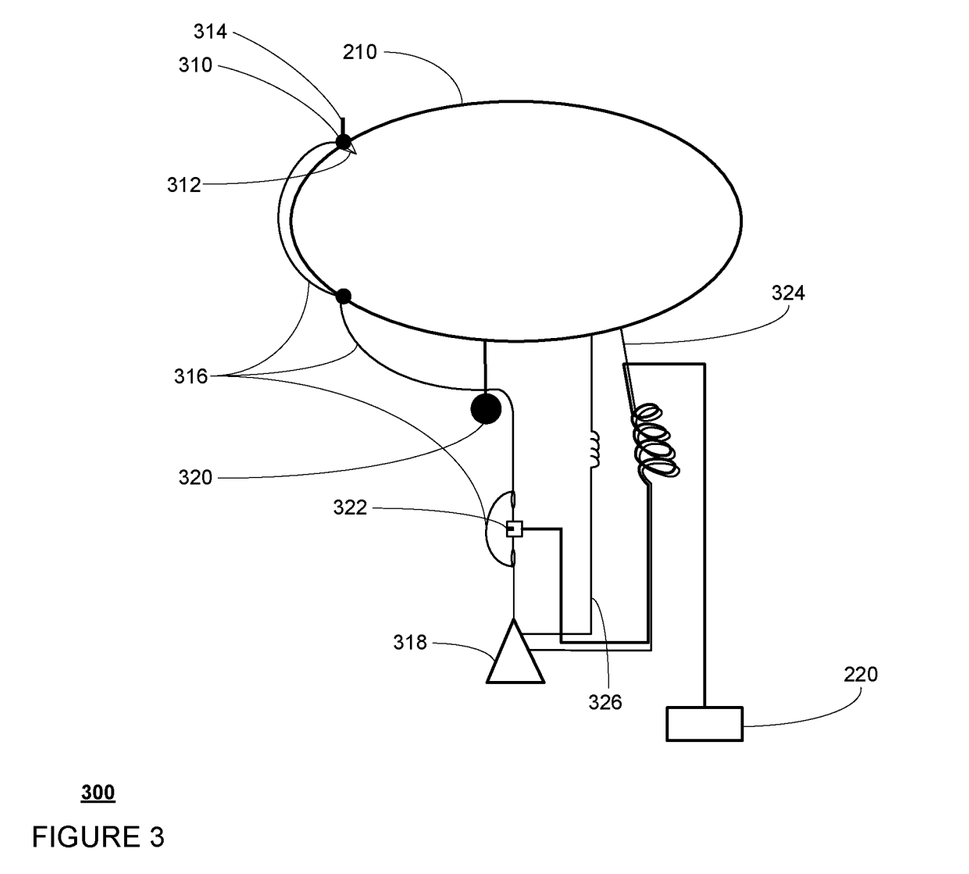
FIG. 3 is an example of a flight termination system in accordance with aspects of the disclosure.

In order to terminate a flight, a balloon may include a flight termination system. The flight termination system may be configured a hole may be cut into the balloon envelope. For example, FIG. 3 depicts an example functional diagram of a typical flight termination system 300 that may be used to terminate the flight of a balloon such as balloon 200. In this example, the flight termination system 300 is attached to the balloon envelope 210 and payload 220 (which are not included in the flight termination system 300). The flight termination system includes a button 310 having a spring loaded cutting edge 312 or other type of cutting device. This cutting device may be activated remotely by an electrical signal to a receiver 314 at the cutting device. In this example, the flight termination system is arranged with a pull cord 316 which can be used to pull on the button 310. When an electrical signal is sent to the receiver 314 to activate the flight termination system, the button may release the cutting device. The cutting device may then cut a hole in a section of the balloon in order to open a hole in the balloon envelope 210, allowing lift gas to escape and the balloon to descend.

However, in some cases, this hole may cause the balloon envelope to deflate too slowly. In that regard, a drop mass 318 having a weight of 30 kg or more or less may be used to pull on the cutting device of the flight termination system 300 and create a larger opening. The flight termination system also includes a redirect 320 for the pull cord to direct the cord towards a drop mass 318. In this example, a load cell 322 is attached to the pull cord and the payload 220. A safety tether 324 holds the drop mass 318 to the balloon envelope 210 to keep the drop mass attached to the balloon envelope during descent of the balloon.

In some examples, the balloon envelope may include a track along which the button runs. At a certain point on the track, such as after 5 or 6 feet, a decelerator 326 may be used to slow the progress of the button. As an example, the decelerator may include a rip stich, which requires the cutting device to pass through the envelope. The stiches can be used to slow down the button and slow the increase in the amount of force with which the balloon envelope loses lift gas.

Of course, adding weight to the balloon to assist the flight termination system can require modification to other aspects of the balloon as well. For instance, the balloon must be configured to both support and store the additional weight during flight. Thus, rather than adding a separate weight, the weight of a balloon's payload may be used to assist the flight termination system.

Figure 4:
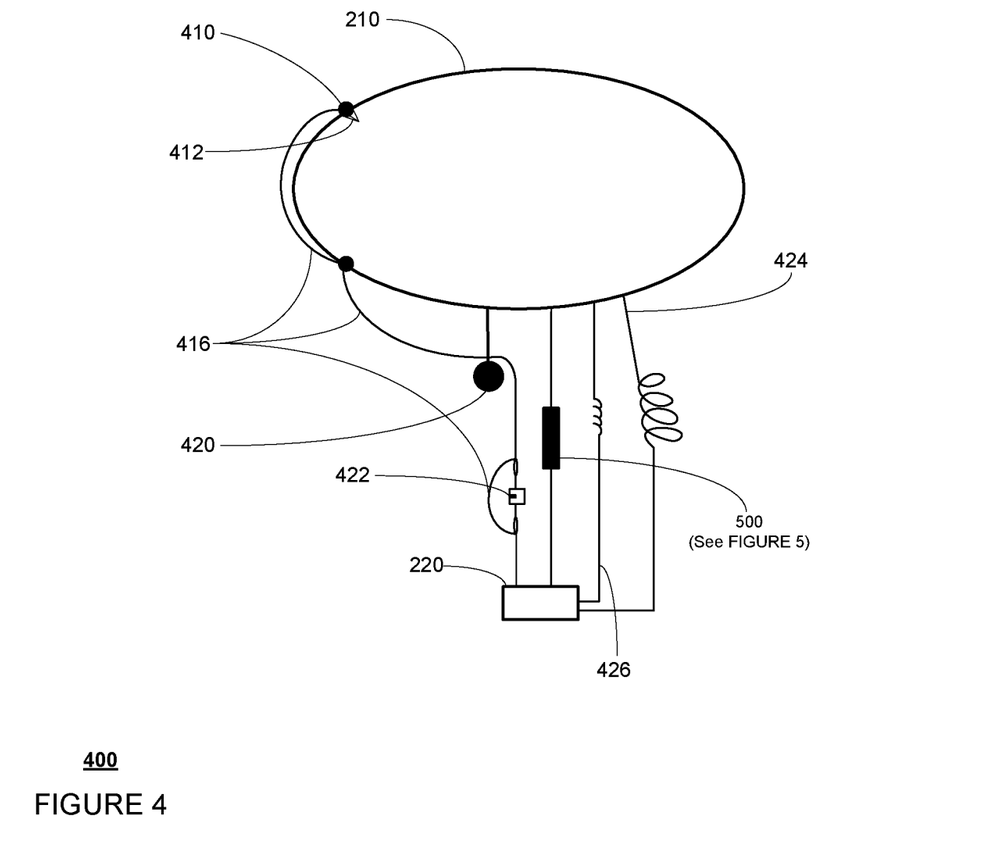
FIG. 4 is an example of another flight termination system in accordance with aspects of the disclosure.

In order to use the weight of the balloon's payload, which may be 30 kg or more or less, the payload may be attached to the balloon envelope in a way that allows the payload to be disconnected from the balloon envelope and to cause a pulling force on the cutting device of the flight termination system. For example, FIG. 4 depicts an example functional diagram of flight termination system 400 attached to the balloon envelope 210 (which is not included in the flight termination system 400) that incorporates the payload 220. Flight termination system 400 may include many of the features of flight termination system 300, such as a button 410 having a spring loaded cutting edge 412 or other type of cutting device, a pull cord 416, a redirect 420, a load cell 422, a safety tether 424, and a decelerator 426. However, unlike flight termination system 300, in flight termination system 400, does not include the drop mass 318, and the button 410 need not include a receiver. In addition, to allow the payload to fall away from the balloon envelope, the balloon may include a payload separation apparatus arranged to separate the balloon envelope from the payload.

Figure 5:
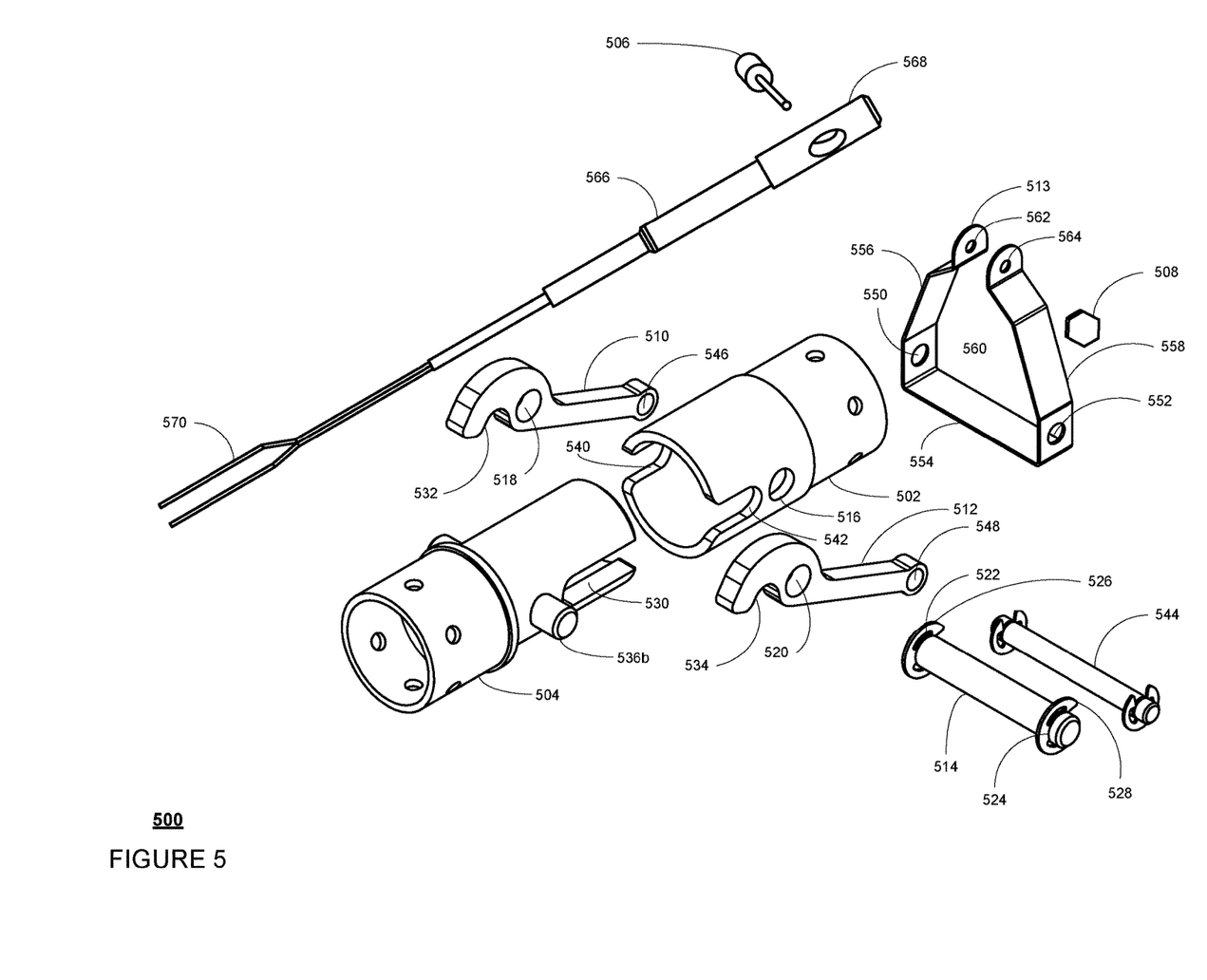
FIG. 5 is a breakaway view of an example payload separation apparatus in accordance with aspects of the disclosure.
Figure 6:
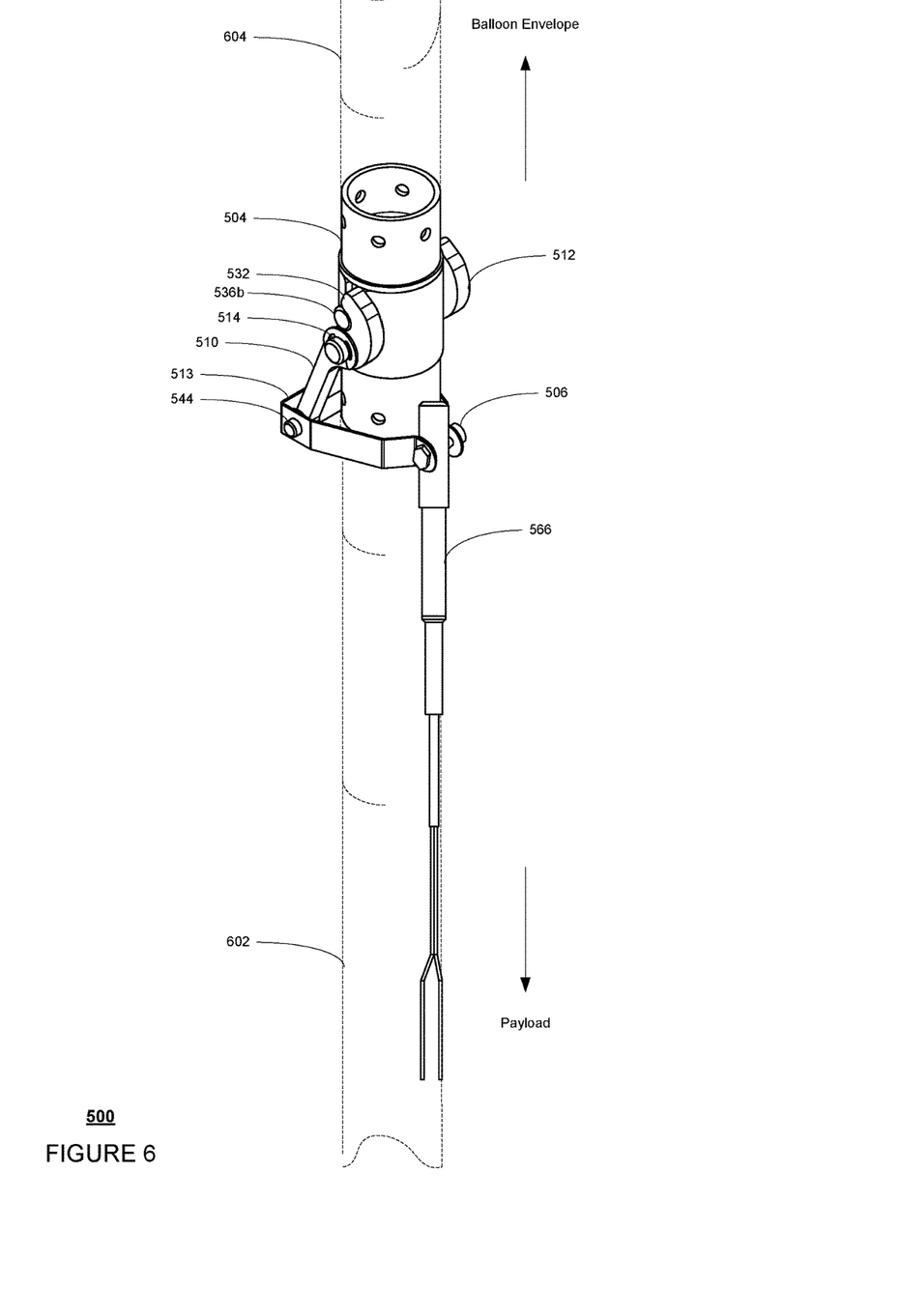
FIG. 6 is another view of the example payload separation apparatus of FIG. 5 with aspects of the disclosure.

FIG. 5 is an example of a payload separation apparatus 500 shown in an exploded view, and FIG. 6 is a perspective view of the payload separation apparatus 500. Prior to separation of the connection between the balloon envelope and payload, the payload separation apparatus may include two shafts 502, 504 which connect with one another and are locked together using a pin 506 and nut 508. For instance, a second shaft 504 may be slid at least partially within a first shaft 502. As an example, the first and second shafts maybe arranged at ends of a pair of 1.5 inch aluminum tubes.

The first and second shafts may be configured to connect with the balloon envelope and the payload, respectively. For example, the first shaft 502 may be configured to attach to a first tube 602 (shown in dashed line in FIG. 6) via bolts, rivets, or other connectors. The first tube 602 may be connected to the payload 220. The second shaft 504 may be configured to attach to a second tube 604 (shown in dashed line in FIG. 6) via bolts, rivets, or other connectors. The second tube 604 may be connected to the balloon envelope 210, for example, at the bottom cap 202 of the balloon. A pair of arms 510, 512 attached to a bracket 513 may be used to secure the first and second shafts 502, 504 to one another, and thereby the balloon envelope and payload, to one another.

The pair of arms 510, 512 may each connect to the first shaft 502 via a first bolt 514. The first bolt 514 may be arranged through a pair of first holes 516 (only a single hole of the pair of first holes being visible in FIG. 5) in the first shaft and a pair of corresponding first holes 518, 520, one in each of the arms 510, 512. The first bolt 514 may be secured to the first shaft 502 using nuts or external retaining rings 522, 524 arranged in corresponding groove 526, 528 on the first bolt. Prior to separation, when the first and second shafts 502, 504 are connected, the first bolt may sit within two first slots 530 (only a single slot of the two first slots being visible in FIG. 5) at opposite sides of the second shaft 504.

Figures 7A, 7B, 7C:
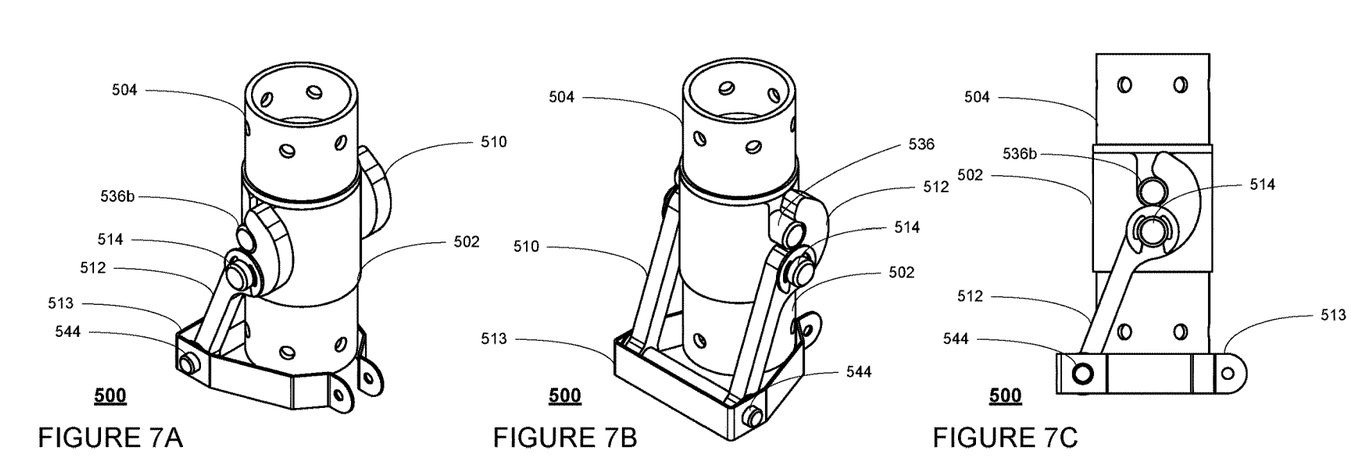
FIGS. 7A-7F are various views of aspects of the example payload separation apparatus of FIG. 5 in accordance with aspects of the disclosure.
Figures 7D, 7E, 7F:
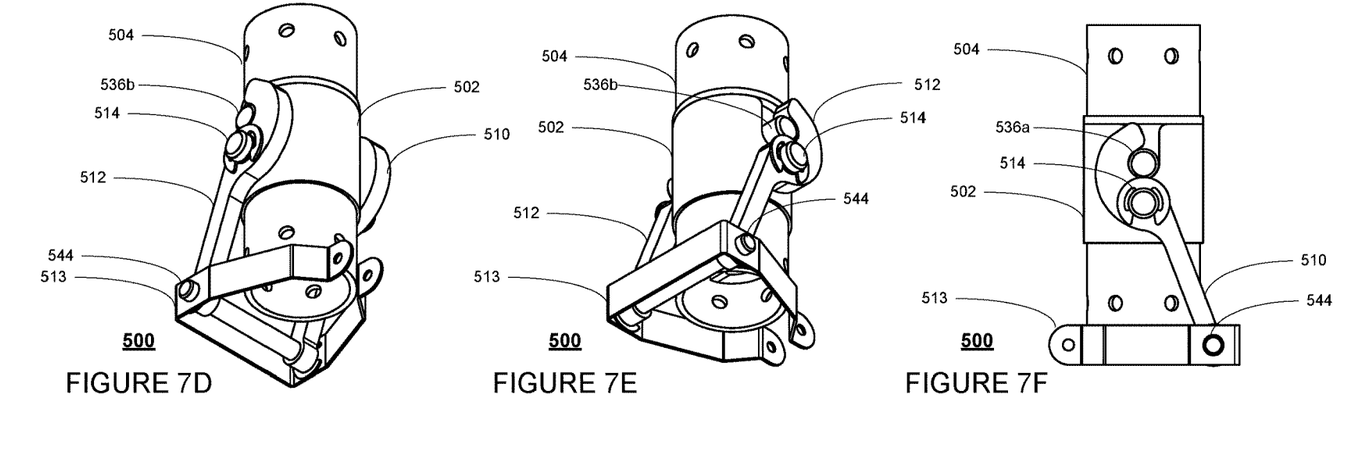

Adjacent to the respective corresponding first hole 518, 520 in each arm 510, 512 may be a curved finger 532, 534 which is configured to rest around at least a part of one of two projections 536a (shown in FIG. 7F), 536b on the second shaft 504. Prior to separation, when the first and second shafts 502, 504 are connected, the projections 536a, 536b may sit within two second slots 540, 542 at opposite sides of the first shaft 502.

Each of the arms 510, 512 may be connected to the bracket 513 via a second bolt 544. For example, at an opposite end of each arm 510, 512 from the fingers 532, 534 may be a corresponding second hole 546, 548. The second holes 546, 548 may be aligned with two first bracket holes 550, 552 in the bracket 513. The second bolt 544 may thus be arranged through the corresponding second holes 546, 548 and the first bracket holes 550, 552. The second bolt may be secured to the bracket using nuts or external retaining rings arranged in corresponding grooves on the second bolt.

The bracket 513 may include a base 554, two bracket arm structures 556, 558, and an opening 560 there between. The two first bracket holes 550, 552 may be arranged through the arm structures 556, 558 proximate to the base 554. At the opposite end of the two bracket arm structures 556, 558 may be two second bracket holes 562, 564. Prior to separation, the bracket arm structures 556, 558 may be arranged around the first shaft 502 such that the first shaft sits within the opening 506. The pin 506, placed through the two second bracket holes 550, 552, holds the bracket arm structures 556, 558 and bracket 513 in place around the first shaft 502.

A squib 566 may be arranged around the pin 506 at a blade end 568 of the squib. The blade end 568 houses a blade (not shown). Opposite of the blade end is a receiver end 570 configured to receive an electrical signal to activate the blade of the blade end 568. The arms 510, 512 and angle of contact with the pin 506 cause the squib 566 to see only a small fraction of the total load on the system. For instance, in a tensile load case of 800 pounds, the pin only has to hold 40-50 pounds, a significant decrease. FIGS. 7A-7F are further example views of the payload separation assembly 500 shown without the squib 566 or pin 506 for simplicity.

In order to keep the payload and balloon envelope secured to one another, while at the same time allowing the payload to fall away from the balloon envelope, a safety tether 324 (shown in FIG. 3) may also be used. As an example, the safety tether may be 28 meters which would allow the payload to "free fall" for 28 meters away from the balloon envelope before being stopped by the tether. Of course longer or shorter tethers may be used depending upon the size of the opening to be cut in the balloon envelope, weight of the payload, weight of the tether etc.

The payload separation apparatus 500 may be formed from various materials. As an example, the bracket may be formed from stainless steel such as Type 301 stainless steel. The first and second shafts 502, 504 may be formed from aluminum or an aluminum alloy such as 6061-t6. The arms 510, 512 may also be formed from aluminum or an aluminum alloy such as 7075-t6. The squib 566 may be any such device including a blade capable of cutting the pin 506 at high altitudes, such as squibs used for sky diving that include metal blades.

Figure 8:
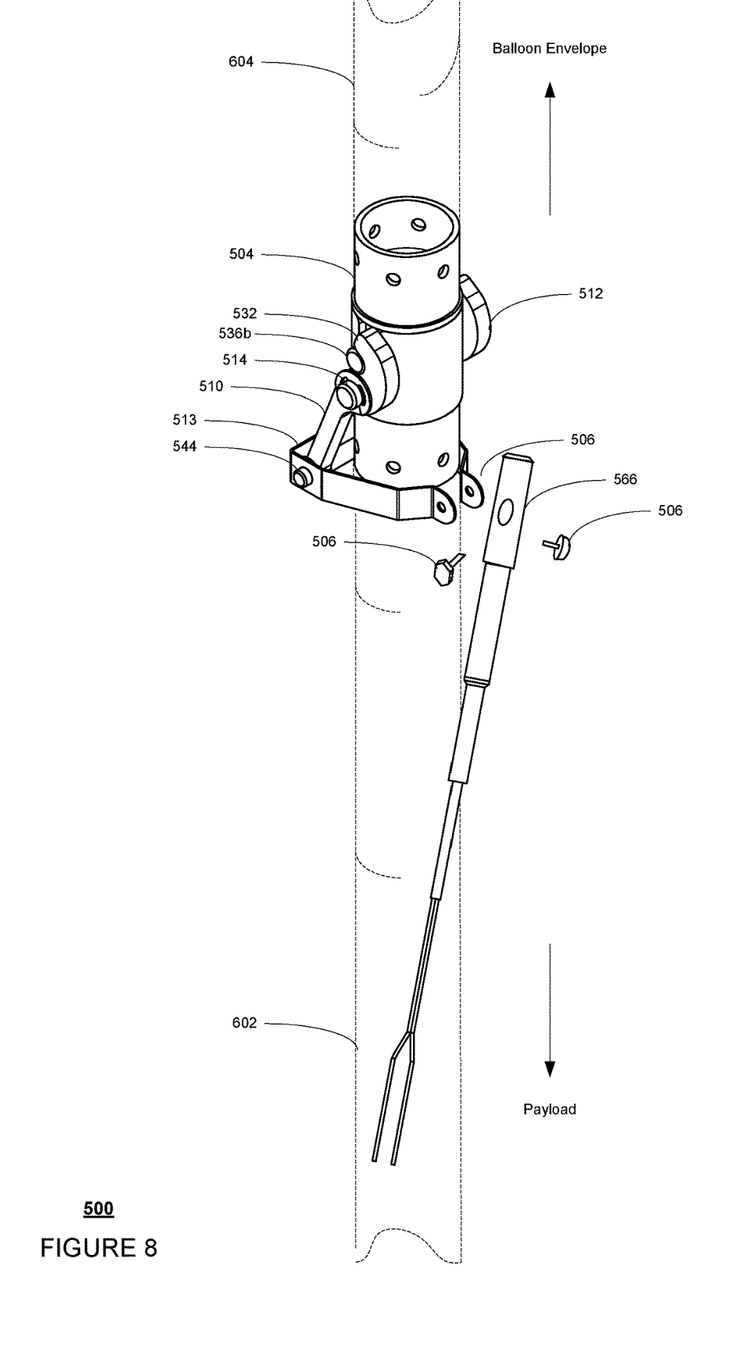
FIGS. 8-10 are an example operation of the example payload separation apparatus of FIG. 5 in accordance with aspects of the disclosure.

As previously discussed, the following operations do not have to be performed in the precise order described below. Rather, as mentioned above, various operations can be handled in a different order or simultaneously, and operations may be added or omitted. The payload separation apparatus 500 may be activated by an electrical signal to the receiver end 570 squib 566. The electrical signal may trigger the squib to release the blade from its housing at the blade end 568 of the squib 566. The blade then cuts through the pin 506. As shown in FIG. 8, pin 506 is broken into two pieces, and squib 566 has fallen away from the bracket 513.

Figure 9:
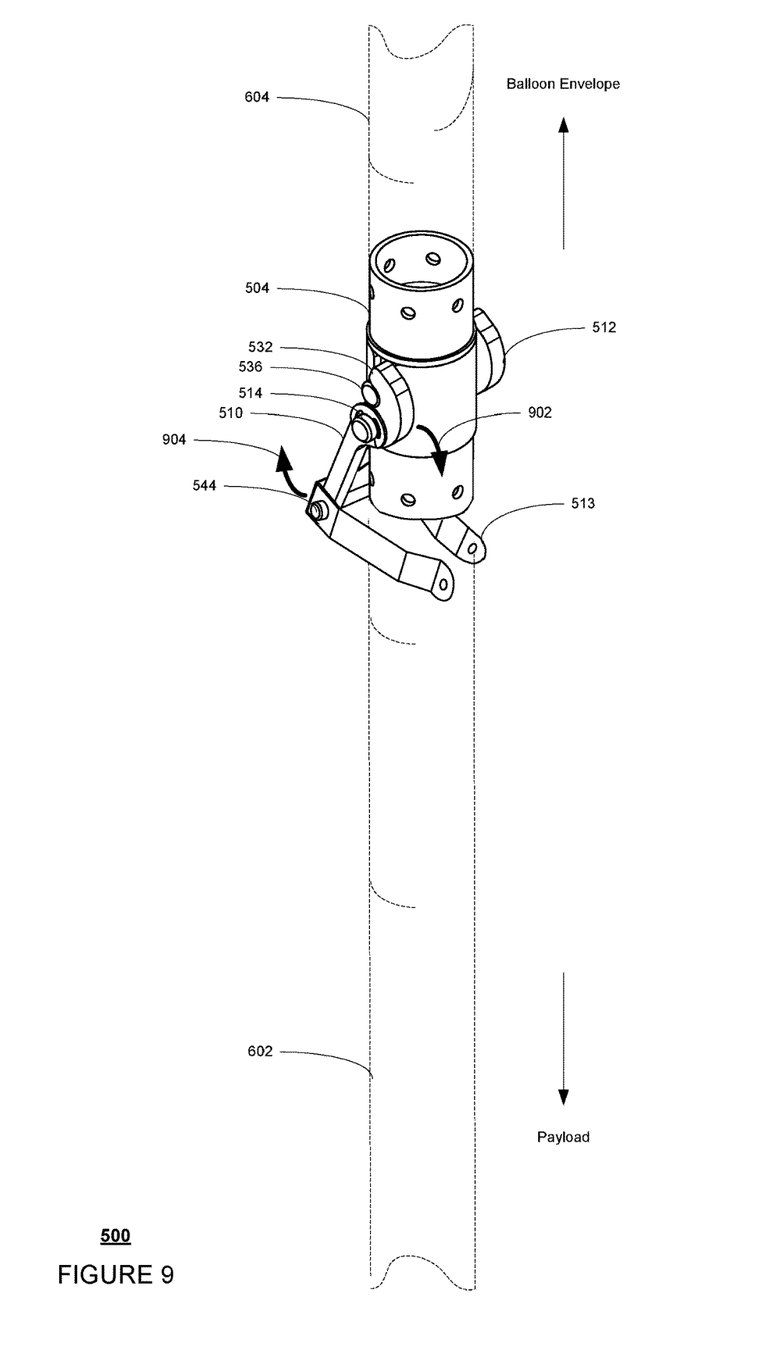
Figure 10:
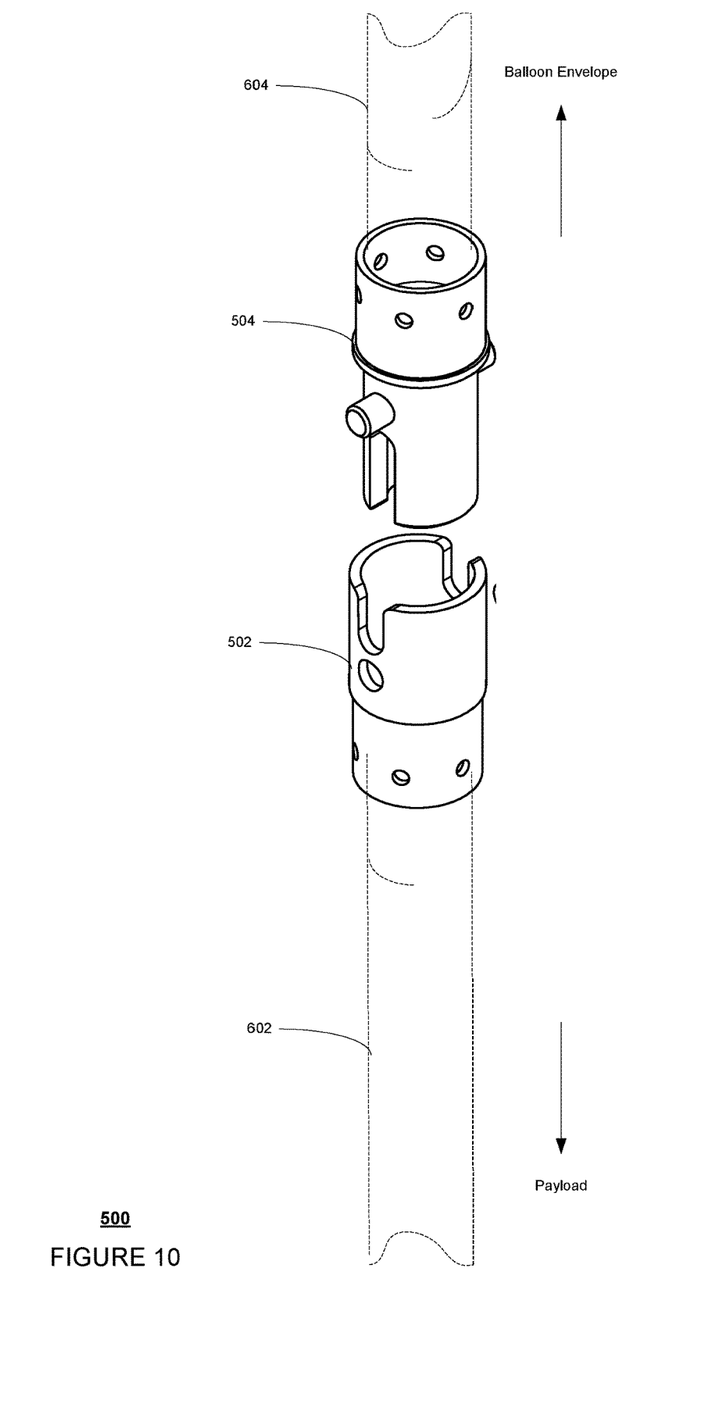

Cutting of the pin 506 causes the bracket arms to separate, releasing the first shaft 502 from the bracket 513. As shown in FIG. 9, the weight of the payload and the angle of the contact area of the arms 510, 512, causes the arms 510, 512 to pivot around first bolt 514 as shown by arrows 902, 904. The curved fingers 532, 534 of the arms 510, 512 release the projections 536a, 536b. At the same time, the pivoting of the arms 510, 512 pulls the base 554 of the bracket 513 away from the first shaft 502. Because there is nothing holding the first and second shafts together, they fall away from one another, as shown in FIG. 10, causing the payload to fall away from the balloon envelope. FIG. 10 depicts only the first and second shafts 502, 504 of the payload separation apparatus 500 for clarity and simplicity, however, the arms 510, 512 and bracket 513 may still remain attached to the first shaft 502 via the first and second bolts 514, 544.

Figure 11:
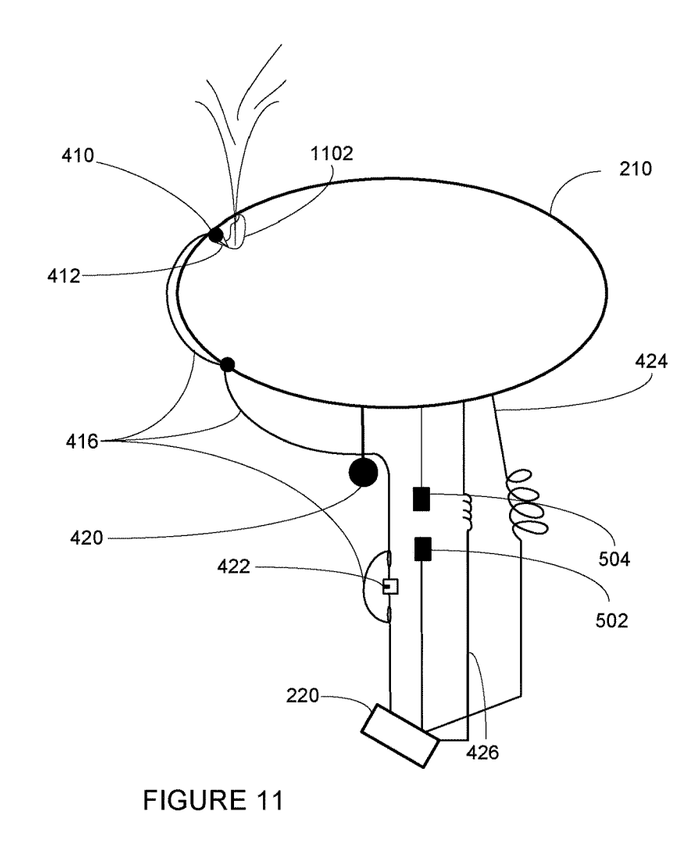
FIGS. 11 and 12 are further examples of the flight termination separation of FIG. 4 in accordance with aspects of the disclosure.
Figure 12:
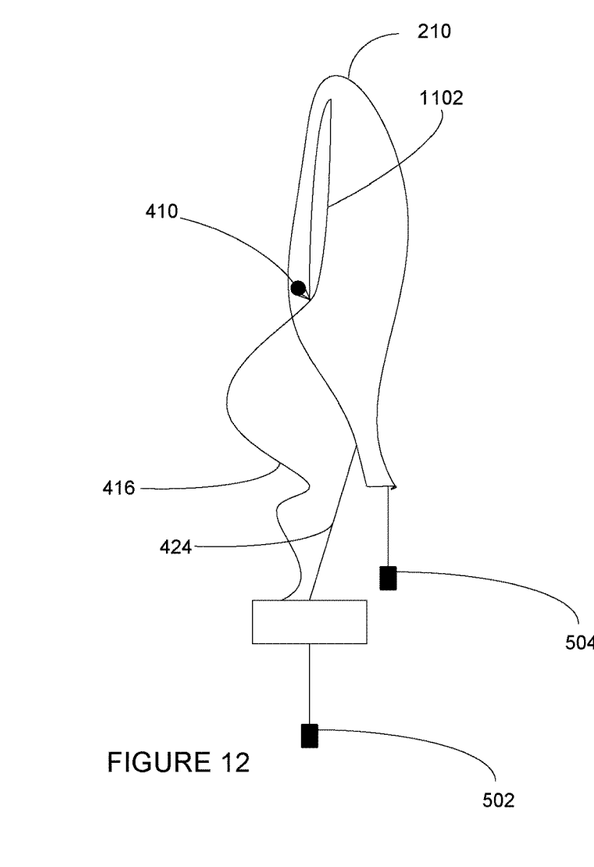

Turning to FIG. 11, separation of first and second shafts 502, 504, causes the payload 220 to fall away from the balloon envelope 210. The initial force of the payload falling away from the balloon envelope yanks down on the flight termination tether 416 which causes a jerking force on the cutting device 412 of the flight termination system 400. The jerking force causes the cutting device to cut an opening 1102 in the balloon envelope. The weight of the falling payload 220 then continues to cause a pulling force on the cutting device 412 via the tether 416. This pulling force causes the cutting device to tear along the length of the track increasing the size of the opening 1102 until it runs along a predetermined portion of the balloon envelope 210 as shown in FIG. 12. At the same time, lift gas escapes through the increasing opening 1102 causing the balloon to descend. Eventually, a decelerator (if used) may slow down the payload to reduce shock loads on the flight termination system. When the payload 220 reaches the end of the safety tether 424 and the button 410 is no longer tearing the balloon envelope 210, the payload 220 may be caught on the safety tether 424 so that the balloon envelope and payload stay together as the balloon continues to descend.

Although the example above describes the payload as being connected to the first shaft and the balloon envelope as being connected to the second shaft, the configuration of the payload separation apparatus may also be reversed with similar effectiveness.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system comprising a separation apparatus for separating a connection between a first object and a second object, the separation apparatus comprising:
    a first shaft configured to attach to the first object, the first shaft including two openings;
    a second shaft configured to attach to the second object, the second shaft including two slots arranged in line with the two openings of the first shaft;
    a first pair of arms;
    a bracket arranged to secure the pair of arms to the first shaft; and
    a bolt arranged through the two openings of the first shaft and the two slots of the second shaft.

2. The system of claim 1, wherein each arm of the pair of arms includes an opening at one end and the bolt is further arranged through the openings in the arms.

3. A system comprising a separation apparatus for separating a connection between a first object and a second object, the first shaft including two slots;
    a first shaft configured to attach to the first object, the first shaft including two slots;
    a second shaft including two openings arranged in line with the two slots of the first shaft;
    a first pair of arms;
    a bracket arranged to secure the pair of arms to the first shaft; and
    a pair of projections on the second shaft arranged through the two openings of the second shaft and the two slots of the first shaft.

4. The system of claim 3, wherein each arm of the pair of arms includes a finger at one end, and each of the fingers are arranged to sit around at least a portion of one of the projections of the pair of projections.

5. The system of claim 1, wherein the bracket includes two openings, each of the arms include an opening at one end, and the system further comprises a bolt arranged through the two openings of the bracket and the openings in the arms, the bolt securing the arms to the bracket.

6. The system of claim 1, wherein the bracket includes two arms and a base which form an opening and the first shaft is arranged within the opening formed by the two arms and the base.

7. The system of claim 6, wherein each arm of the bracket includes a corresponding opening.

8. The system of claim 7, further comprises a pin arranged through the corresponding openings of the arms of the bracket.

9. The system of claim 1, further comprising a pin configured to break and release the first object from the second object.

10. The system of claim 9, further comprising a cutting device configured to cut the pin and release the bracket from the first shaft.

11. The system of claim 9, further comprising a squib arranged around the pin, the squib housing a cutting device.

12. The system of claim 9, wherein the bracket includes two arms and each arm of the bracket includes a corresponding opening through which the pin is arranged.

13. The system of claim 1, further comprising the first object.

14. The system of claim 13, further comprising the second object.

15. The system of claim 1, wherein the first shaft, second shaft, and first pair of arms comprise aluminum.

16. The system of claim 1, wherein the first shaft, second shaft, and first pair of arms comprise an aluminum alloy.

17. The system of claim 1, wherein the bracket comprises stainless steel.

18. The system of claim 1, wherein the bracket and the first pair of arms are configured to temporarily secure the first shaft to the second shaft.

19. The system of claim 18, further comprising a squib having a receiver configured to activate the squib and release the first shaft from the second shaft upon receipt of an electrical signal.

20. The system of claim 1, wherein the second shaft includes two openings, the first shaft includes two slots arranged in line with the two openings, and the system further includes a pair of projections on the second shaft arranged through the two openings of the second shaft and the two slots of the first shaft.

21. The system of claim 3, wherein each arm of the pair of arms includes an opening at one end and the system further comprises a bolt arranged through the openings in the arms.

22. The system of claim 3, wherein each arm of the pair of arms includes a finger at one end, and each of the fingers are arranged to sit around at least a portion of one of the projections of the pair of projections.

23. The system of claim 3, wherein the bracket includes two openings, each of the arms include an opening at one end, and the system further comprises a bolt arranged through the two openings of the bracket and the openings in the arms, the bolt securing the arms to the bracket.

24. The system of claim 3, wherein the bracket includes two arms and a base which form an opening and the first shaft is arranged within the opening formed by the two arms and the base.

25. The system of claim 24, wherein each arm of the bracket includes a corresponding opening.

26. The system of claim 25, further comprises a pin arranged through the corresponding openings of the arms of the bracket.

27. The system of claim 3, further comprising a pin configured to break and release the first object from the second object.

28. The system of claim 27, further comprising a cutting device configured to cut the pin and release the bracket from the first shaft.

29. The system of claim 27, further comprising a squib arranged around the pin, the squib housing a cutting device.

30. The system of claim 27, wherein the bracket includes two arms and each arm of the bracket includes a corresponding opening through which the pin is arranged.

31. The system of claim 3, further comprising the first object.

32. The system of claim 31, further comprising the second object.

33. The system of claim 3, wherein the first shaft, second shaft, and first pair of arms comprise aluminum.

34. The system of claim 3, wherein the first shaft, second shaft, and first pair of arms comprise an aluminum alloy.

35. The system of claim 3, wherein the bracket comprises stainless steel.

36. The system of claim 3, wherein the bracket and the first pair of arms are configured to temporarily secure the first shaft to the second shaft.

37. The system of claim 36, further comprising a squib having a receiver configured to activate the squib and release the first shaft from the second shaft upon receipt of an electrical signal.

38. The system of claim 14, wherein the first object is a payload and the second object is a balloon envelope.

* * * * *

UNITED STATES PATENT AND TRADEMARK OFFICE
CERTIFICATE OF CORRECTION

| | |
|---|---|
| PATENT NO. | : 10,450,046 B1 |
| APPLICATION NO. | : 16/043515 |
| DATED | : October 22, 2019 |
| INVENTOR(S) | : Michael Hall-Snyder and Kyle Brookes |

It is certified that error appears in the above-identified patent and that said Letters Patent is hereby corrected as shown below:

In the Claims

Claim 3
Column 10, Line 20:
Now reads "the first shaft including two slots;" should read -- the separation apparatus comprising: --

Signed and Sealed this
Tenth Day of December, 2019

Andrei Iancu
*Director of the United States Patent and Trademark Office*